Jan. 27, 1959
E. A. BEHN
2,871,273
PRODUCTION OF ACETYLENIC DIOLS
Filed May 4, 1956
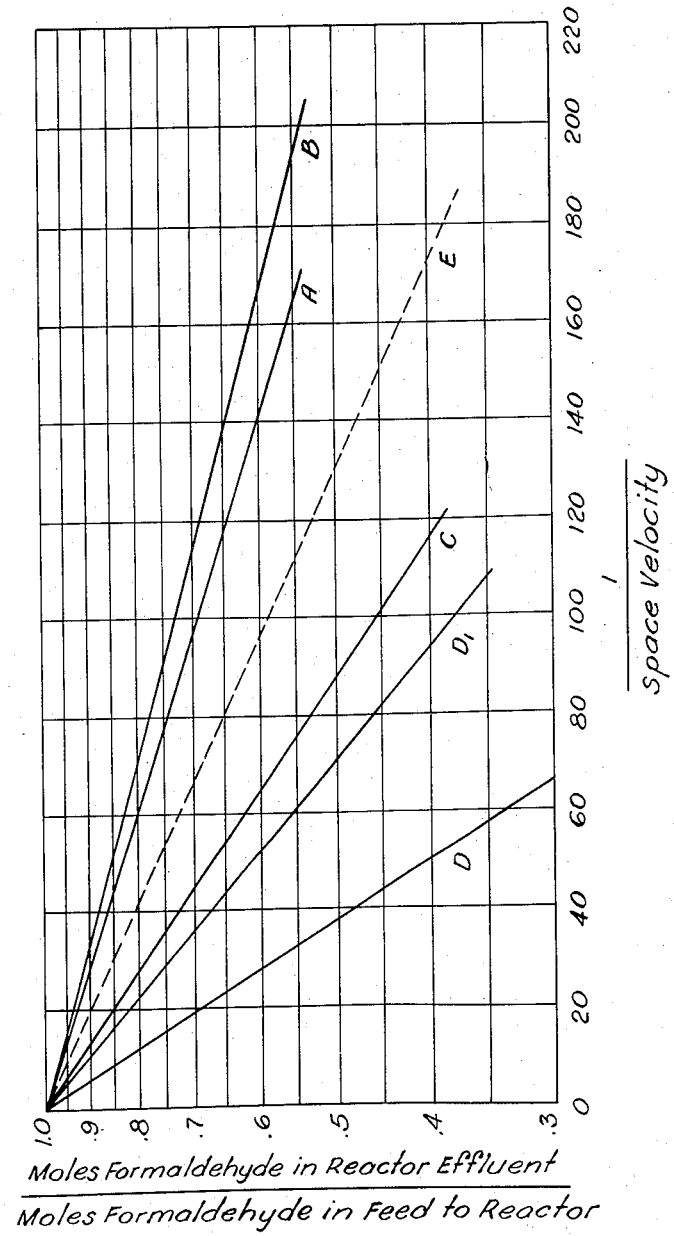
INVENTOR.
Eugene A. Behn
BY
Griswold & Burdick
ATTORNEYS United States Patent Office 2,871,273
Patented Jan. 27, 1959

2,871,273

PRODUCTION OF ACETYLENIC DIOLS

Eugene A. Behn, Lake Jackson, Tex., assignor to The Dow Chemical Company, Midland, Mich., a corporation of Delaware Application May 4, 1956, Serial No. 582,860

8 Claims. (Cl. 260—635)

This invention relates to an improved process for preparation of acetylenic diols by reaction of acetylene with an aldehyde and, more particularly, to preparation of the diols by use of a copper oxide and bismuth oxide catalyst upon a magnesium silicate support.

The use of a copper oxide and bismuth oxide as a catalyst for preparation of acetylenic diols by the reaction of acetylene with aldehydes is known and is disclosed in United States Department of Commerce, Publication Board Report No. 28,556 (August 9, 1946) where the constituents were used impregnated upon silica strings as a carrier. In the catalyst the active ingredient is the copper oxide which upon contact with the acetylene in the reactor is converted to copper acetylide which catalyzes the reaction. The bismuth is added to the catalyst to retard the formation of cuprene which, if not inhibited, would rapidly accumulate and clog the catalyst bed.

In using a copper oxide and bismuth oxide catalyst in preparation of acetylenic diols certain disadvantages are encountered. In order to obtain a high reaction rate, the reaction pressure has to be above 80 p. s. i. g. In processes where acetylene is used, it is desirable to operate at the lowest possible pressure to avoid the explosiveness of the acetylene. Acetylene may be safely handled at low pressures while at higher pressures, due to the possibility of detonation of the acetylene, special equipment is required. Another disadvantage is the relatively short life of the catalyst. Since catalysts are expensive, the operating costs are greatly increased if it is necessary to frequently replace it. To replace the catalyst it is often necessary to shut down the equipment, thus, decreasing the output from a particular unit which further increases the operating costs. In addition, the use of the catalyst created a hazard. Due to some side reaction, the copper acetylide was displaced from the catalyst support and deposited in the lines and other parts of the equipment. Copper acetylide is surprisingly stable when deposited upon the catalyst support, but it is explosive when not in contact with the carrier and is sensitive to stroke, shock, and air. It was necessary to remove the deposited copper acetylide from the equipment by use of strong hydrochloric acid or other means to prevent its accumulation. The migration of the copper acetylide not only created a hazard, but it is the main reason for the rapid deterioration of the catalyst.

It is, therefore, the object of this invention to provide a process for preparation of acetylenic diols by reaction of acetylene and an aldehyde wherein a high reaction rate can be obtained at low pressure so that costly high pressure equpiment would not be necessary. Another object is to provide a process wherein the catalyst has a long life, thus, not requiring frequent replacement of the expensive catalyst. A further object is to have a process wherein the deposition of copper acetylide in the equipment is practically eliminated avoiding costly shutdowns necessary to remove the deposition and eliminating the explosion hazard.

In a process for preparation of acetylenic diols by reaction of acetylene with an aldehyde in presence of a copper oxide and bismuth oxide catalyst, the above and other objects can be accomplished by the invention, which comprises contacting the acetylene and the aldehyde with a catalyst consisting of copper oxide and bismuth oxide impregnated upon a magnesium silicate support.

It has been discovered that the carrier or support used for the catalyst greatly affect the activity and stability of the catalyst. When a copper oxide and bismuth oxide are impregnated upon a magnesium silicate support, the activity of the catalyst is increased so that a higher rate of reaction can be obtained with this catalyst at a reaction pressure of 20 p. s. i. g. than with other catalyst supports at 80 p. s. i. g. The life of the catalyst is more than doubled and the deposition of copper acetylide in the equipment practically eliminated.

The attached figure shows the comparison of the reaction rates obtained when catalysts having different supports are used in the reaction of formaldehyde and acetylene to form 1,4-butynediol as obtained in Example I. In the figure the abscissa represents the reciprocal of the space velocities in units of minutes where the space velocity is defined as the ratio of the volume of the formaldehyde solution expressed in cubic feet to the volume of catalyst also expressed in cubic feet. The ordinate represents the ratio of moles of formaldehyde in the effluent to moles of formaldehyde charged. This ratio decreases as the conversion of the reactants increases. Thus, the curve with the greater negative slope indicates the more active catalyst. The different catalysts used were identified by capital alphabetical letters and the curves shown on the figure indicate the results obtained. The dashed curve identified by letter "E" is a plot of the results obtained by I. G. Farben Industries at Ludwigshafen, as reported on page 5 in their report entitled "Kinetics of Butynediol," dated December 21, 1938, and reproduced on the Technical Oil Mission microfilm reels. It is plotted to show the relative comparison of this catalyst with the others. In determining these curves, the reaction was carried out at 80 p. s. i. g. for all of the catalysts. For the catalyst containing the magnesium silicate support, an additional run was made at a pressure of 20 p. s. i. g. The curve identified by letter "D" is the results obtained with this catalyst at 80 p. s. i. g. and "$D_1$" indicates the results for 20 p. s. i. g. From the figure it can be seen that the rate of reaction obtained with the catalyst with the magnesium silicate support is much greater at a reaction pressure of 20 p. s. i. g. than with the other catalysts at 80 p. s. i. g.

The deterioration of the catalyst in this process is due to two factors. The accumulation of cuprene may clog the catalyst bed, but its formation is sufficiently retarded by the bismuth to reduce it to secondary importance. The main reason for rapid loss of effectiveness of the catalyst is due to the loss of copper. It is believed that the loss of copper acetylide is due to a side reaction resulting in formation of higher acetylenes which are carried with the reactants and which later react with additional aldehyde depositing the copper acetylide on the equipment. On page 9 of the cited report entitled "Kinetics of Butynediol," it was shown that the rate of the copper loss followed closely that of a monomolecular reaction and could be represented by the following rate equation:

$$\frac{dx}{dt}=k(a-x); \quad k=\frac{1}{t}\ln\frac{a}{a-x}$$

where $a$ = initial concentration on catalyst in percent
$x$ = amount of copper loss in percent
$a-x$ = amount of copper on catalyst in percent
$t$ = time in hours
$k$ = reaction constant
$ln$ = natural logarithm A comparison of the copper loss from catalyst using different supports was made as indicated in Example II. From the results the reaction constant, $k$, was determined and the length of time that the catalyst can be used before losing half of its copper was calculated. The following table indicates the half life of the catalysts.

| Catalyst | $k$ | Half life, hours |
| --- | --- | --- |
| A | .0312 | 22.2 |
| B | .0256 | 27.1 |
| C | .00133 | 524 |
| D (magnesium silicate support) | $3.52 \times 10^{-5}$ | $1.97 \times 10^4$ |

It can be seen that the magnesium silicate supported catalyst has an exceptionally long catalyst life.

The exceptionally long catalyst life and the high rate of reaction obtained at low pressure in the process of the invention are due to the magnesium silicate support. The catalyst may be prepared according to the conventional methods. For example, aqueous solutions of salts of bismuth and copper may be impregnated upon magnesium silicate, thoroughly mixed, and calcined to convert the bismuth and the copper to oxide forms. After calcining, the mixture is mixed with graphite to serve as a lubricant, tabletted and dried. The catalyst should contain from 2 to 3 weight percent bismuth and the percent of copper may be varied from 8 to 15 weight percent with the remainder being the magnesium silicate support. Catalyst containing from 12 to 15 weight percent copper is preferred.

The improved process may be applied in the methods presently adopted in the preparation of acetylenic diols by the reaction of acetylene and an aldehyde using a copper oxide and bismuth oxide catalyst. A convenient method is to maintain an acetylene atmosphere in the reactor and to continuously introduce the liquid aldehyde at the top of the reactor. The liquid aldehyde in passing down through the catalyst bed contacts the acetylene in the presence of the catalyst. A reaction temperature ranging from 80° to 120° C. may be maintained, though it is preferred to have the temperature below 110° C. At temperatures higher than 120° C. the catalyst loses its activity rapidly. Reaction pressure up to 120 p. s. i. g. may be used. However, for safety reasons, it is preferred to operate at pressures in the range of 15 to 50 p. s. i. g. The reaction rate increases with pressure, but it is seldom necessary to operate above 20 p. s. i. g. since the reaction rate is relatively rapid at these low pressures. In the process there is no evidence of copper acetylide depositing anywhere in the equipment and the catalyst can be used for periods greater than a year.

The following examples further illustrate the invention.

EXAMPLE I

A continuous reactor, 15.5 inches in diameter and 15.5 feet in height, was loaded with 19 cubic feet of catalyst consisting of a copper oxide and bismuth oxide upon a magnesium silicate support analyzing 15 weight percent copper, 2.1 weight percent bismuth, and the remainder magnesium silicate.

An aqueous solution containing 37 weight percent of formaldehyde was fed continuously into the reactor above the catalyst bed and allowed to pass down through the bed. An acetylene atmosphere was maintained in the reactors by continuously introducing acetylene near the top. The rate of the formaldehyde solution was periodically changed and samples of the effluent were taken from the reactor and analyzed for formaldehyde at the different rates. Two runs were made at 110° C. with one run being at a pressure of 80 p. s. i. g. and the other at 20 p. s. i. g. The following results were obtained.

| Reciprocal of space velocity, minutes | Ratio of moles of formaldehyde in effluent to mole of formaldehyde fed to reactor | |
| --- | --- | --- |
| | Reactor at 20 p. s. i. g. | Reactor at 80 p. s. i. g. |
| 10 | .90 | 0.86 |
| 20 | .81 | 0.67 |
| 40 | .67 | 0.47 |
| 80 | .46 | 0.26 |
| 120 | .32 | |

The ratio of moles formaldehyde in the effluent from the reactor to the moles of formaldehyde charged is plotted against the reciprocal of the space velocities on the attached figure. The curve for the 80 p. s. i. g. is identified by letter "D" and the curve for 20 p. s. i. g. is indicated by letter "$D_1$."

To compare the rate of reaction obtained with magnesium silicate supported catalyst with catalysts using other carriers, runs were made with the other catalysts at 80 p. s. i. g. using the above equipment and procedure. The analyses of the additional catalysts tested were as follows:

| Catalyst | Copper weight, percent | Bismuth weight, percent | Catalyst support |
| --- | --- | --- | --- |
| A | 13.7 | 2.8 | ¼" pellets of calcium silicate. |
| B | 13.7 | 2.8 | 6-12 granular mesh diatomaceous earth. |
| C | 3.8 | 0.7 | Silica gel. |

The results obtained are given below and are plotted on the attached figure. The curves on the figure for the particular catalyst are identified by the letter assigned to the catalyst.

Catalyst A 13.7% COPPER AND 2.8% BISMUTH ON ¼" PELLETS OF CALCIUM SILICATE

| Reciprocal of space velocity, minutes | Ratio of moles formaldehyde in effluent to moles of formaldehyde fed to reactor |
| --- | --- |
| 11 | 0.96 |
| 22 | 0.90 |
| 50 | 0.83 |
| 80 | 0.75 |
| 120 | 0.65 |
| 150 | 0.58 |

Catalyst B 13.7% COPPER AND 2.8% BISMUTH ON 6-12 MESH GRANULAR DIATOMACEOUS EARTH

| Reciprocal of space velocity, minutes | Ratio of moles formaldehyde in effluent to moles of formaldehyde fed to reactor |
| --- | --- |
| 20 | 0.93 |
| 60 | 0.83 |
| 80 | 0.78 |
| 120 | 0.69 |
| 160 | 0.56 |

Catalyst C

3.8% COPPER AND 0.7% BISMUTH ON GRANULAR SILICA GEL

| Reciprocal of space velocity, minutes | Ratio of moles formaldehyde in effluent to moles of formaldehyde fed to reactor |
|---|---|
| 10 | 0.91 |
| 25 | 0.78 |
| 44 | 0.70 |
| 80 | 0.53 |
| 120 | 0.39 |

EXAMPLE II

The reactor described in Example I, was loaded with 19 cubic feet of catalyst consisting of a copper oxide and bismuth oxide upon a magnesium silicate support which analyzed 15 weight percent copper, 3.0 weight percent bismuth, and the remainder magnesium silicate.

An aqueous solution containing 37 weight percent formaldehyde was fed to the top of the reactor at a rate of 7 gallons per hour. The reactor was heated to 85° C. and the acetylene introduced into the reactor at a rate of 130 standard cubic feet per hour. The acetylene pressure maintained was 18 p. s. i. g. The reaction temperature rose from 85° to 110° C.

The product was obtained in the amount of 7.7 gallons per hour. The product was neutralized to a pH of 5 with caustic soda and distilled to obtain the 1,4-butynediol. The yield of 1,4-butynediol based upon the acetylene was 78 percent and 90 percent upon the formaldehyde reacted.

The unit was operated at the above conditions for over 8 months. After this time the reactor was shut down and the equipment disassembled and inspected. No copper acetylide was found in the equipment and very little cuprene was found in the catalyst. The catalyst was analyzed for copper content and found to contain 12.4 weight percent.

To compare the copper loss of the magnesium silicate supported catalyst with catalysts using other carriers, the above procedure was followed except that the reaction pressure was increased to 80 p. s. i. g. and the length of time of the runs was shorter. The catalysts of Example I were used. The catalysts were anlyzed to determine their copper content before and after the run.

The following results were obtained:

| Catalyst | Initial copper content | Copper content after run | Length of run, hour |
|---|---|---|---|
| A | 13.7 | 6.3 | 25 |
| B | 13.7 | 8.2 | 20 |
| C | 3.8 | 2.2 | 400 |

The loss of copper from the catalyst when silica strings were used as support, as shown by the cited report entitled, "Kinetics of Butynediol," on page 9, indicates that the copper content decreased from the initial 12.0 weight percent to 7.4 weight percent in 18 hours.

What is claimed is:

1. In a process for preparation of acetylenic diols by reaction of acetylene with an aldehyde, in the presence of a copper oxide and bismuth oxide catalyst, the improvement, which comprises contacting the reactants with the catalyst impregnated upon a magnesium silicate carrier.

2. In a process for preparation of acetylenic diols by reaction of acetylene with an aldehyde, in presence of a copper oxide and bismuth oxide catalyst, the improvement, which comprises contacting the reactants with the catalyst impregnated upon a magnesium silicate carrier at a pressure ranging from 15 to 50 p. s. i. g.

3. A process for preparation of acetylenic diols which comprises intermixing an aldehyde with acetylene, contacting the mixture with a catalyst consisting essentially of from 8 to 15 weight percent copper and from 2 to 3 weight percent bismuth impregnated as copper oxide and bismuth oxide upon a magnesium silicate support at a temperature in the range of 80° to 120° C. and a pressure ranging from 15 to 120 p. s. i. g. for a length of time to obtain substantial conversion of the reactants, and separating the acetylenic diols formed.

4. A process according to claim 3, wherein the aldehyde is formaldehyde.

5. A process according to claim 3, wherein the aldehyde is acetaldehyde.

6. A process for preparation of acetylenic diols which comprises intermixing an aldehyde with acetylene, contacting the mixture with a catalyst consisting essentially of 12 to 15 weight percent copper and 2 to 3 weight percent bismuth dispersed as copper oxide and bismuth oxide upon a magnesium silicate support at a temperature of 85° to 110° C. and a pressure ranging from 15 to 50 p. s. i. g. for a length of time to obtain substantially complete conversion of the reactants, and separating the acetylenic diol formed.

7. A process according to claim 6, wherein the aldehyde is formaldehyde.

8. A process according to claim 6, wherein the aldehyde is acetaldehyde.

References Cited in the file of this patent

UNITED STATES PATENTS

| | | |
|---|---|---|
| 2,232,867 | Reppe et al. | Feb. 25, 1941 |
| 2,300,969 | Reppe et al. | Nov. 3, 1942 |
| 2,768,215 | Hecht | Oct. 23, 1956 |